Figures 1, 2:
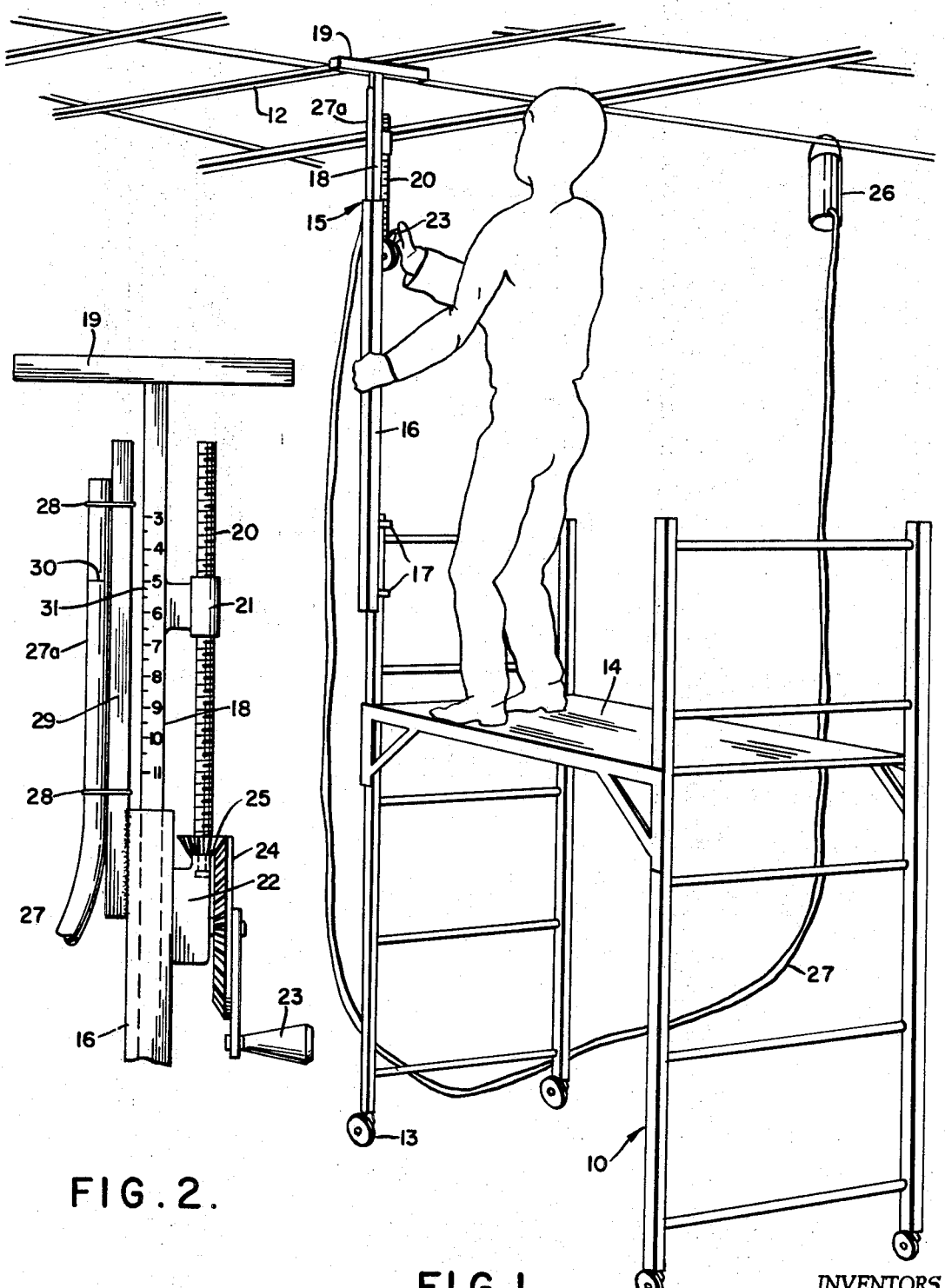

United States Patent

[11] 3,540,548

[72] Inventors Paul F. Halsey;
 Daniel C. Tevis, Wichita, Kansas
[21] Appl. No. 782,603
[22] Filed Dec. 10, 1968
[45] Patented Nov. 17, 1970
[73] Assignee Adapa, Incorporated

[54] JACK WITH LEVELING MEANS
 3 Claims, 2 Drawing Figs.
[52] U.S. Cl. ................................................ 182/129;
 33/209; 254/7
[51] Int. Cl. ................................................... E04g 1/00
[50] Field of Search ........................................ 182/129;
 33/209; 254/7.2

[56] References Cited
 UNITED STATES PATENTS
 318,885 5/1885 Espenschied ................. 33/209X 2,382,525 8/1945 Wellington .................. 33/209
2,882,100 4/1959 Bank .......................... 182/129

Primary Examiner—Kenneth Downey
Attorney—Munson H. Lane and Munson H. Lane, Jr.

ABSTRACT: A mobile scaffold carrying a jack which includes a base member and a relatively slidable load support member extending upwardly from the base member, the support member being screw-actuated. A fluid level has a flexible tube connected to a fluid reservoir remote from the jack, a portion of the tube being transparent and secured to the jack base member so that it extends alongside the slidable load support member. The fluid level in the transparent tube portion may be observed with respect to graduations marked on the support member.

Patented Nov. 17, 1970

3,540,548

INVENTORS
Paul F. Halsey &
Daniel C. Tevis

BY *Munson H. Lane*

ATTORNEY

JACK WITH LEVELING MEANS

This invention relates to new and useful improvements in jacks and particularly jacks which are mounted on a mobile scaffold to facilitate installation of supporting grids or framework for suspended ceilings of various types.

In ceiling construction work of this nature, it is essential for the grid or framework components to be horizontally coplanar and the jack is utilized to support the same until they are permanently fastened. It is known in the art to utilize a fluid level for horizontally locating the components relative to one another during installation, but such use of the fluid level is separate from the component installation procedure itself and therefore consumes valuable time.

It is the principal object of the invention to substantially simplify and greatly expedite highly accurate installation of ceiling components, this being achieved by combining the fluid level with the scaffold-mounted jack so that when the jack is used to temporarily support a component, the associated fluid level readily indicates the position of that component relative to others and, if necessary, the jack may be raised or lowered in order to place the component at the proper level.

Thus, the jack with the associated leveling means permits one worker to perform the installation of components with much greater speed and accuracy than has heretofore been possible, and the invention also eliminates the use of leveled "dry lines" as they are known in the trade. dr With the foregoing more important object and features in view and such other objects and features which may become apparent as this specification proceeds, the invention will be understood from the following description taken in conjunction with the accompanying drawings, wherein like characters of reference are used to designate like parts, and wherein:

FIG. 1 is a perspective view showing the scaffold-mounted jack with leveling means of the invention in use; and FIG. 2 is an enlarged, fragmentary elevational view of the jack.

Referring now to the accompanying drawings in detail, the numeral 10 generally designates a conventional mobile scaffold such as is commonly used during installation of supporting grids or framework components 12 of a suspended ceiling. The scaffold includes the usual casters or traveling wheels 13 and a workman's platform 14, as will be clearly apparent.

The scaffold carries a jack designated generally as 15, the same comprising an elongated base member 16 which is secured to the scaffold in any suitable manner, as for example by clamps 17, and extends upwardly therefrom. The jack also includes a load support member 18 which is slidably telescoped in the base member 16 and may be provided at its upper end with a cross bar 19 to supportably engage the ceiling components 12.

The support member 18 of the jack may be raised or lowered relative to the base member 16 by a screw-type actuator comprising a screw-threaded shaft 20 which operatively engages a tubular nut 21 secured to one side of the support member 18. The shaft 20 extends alongside the member 18 to a bearing block 22 which is fastened to the base member 16. A rotatable hand crank 23 is also journaled in the block 22 and is rotatable with a bevel gear 24 meshing with a bevel pinion 25 which is secured to the lower end portion of the shaft 20. Thus it will be understood that by rotating the crank 23 in one direction or the other, the load support member 18 with its associated cross bar 19 may be raised or lowered relative to the base member 16 of the jack, so that when the cross bar 19 is engaged with one of the ceiling components 12, that component may be raised or lowered and temporarily supported until it is permanently fixed in place.

As already indicated, the various ceiling components are required to be horizontally coplanar with one another, and thus it is necessary to raise or lower the supporting member 18 of the jack in order to hold a component at the proper level. Ordinarily, it is common to utilize a fluid level which is applied to the component in order to determine its elevation relative to other components, but this is a time-consuming procedure which is separate from and additional to the component installation itself. Rather, the invention provides a fluid level which is associated with the jack 15, so that the elevation of a component may be quickly and easily determined as a function of supporting the component by the jack.

The fluid level employed in the invention comprises a fluid reservoir 26 which is suspended from a previously installed component as in conventional practice. The reservoir 26 has connected thereto a flexible hose 27, preferably of clear plastic material. The hose 27 has a vertical end portion 27a which is secured in any suitable manner, as by keeper bands 28, to an upright extension bar 29. The latter has its lower end portion suitably secured to the upper end portion of the jack base member 16 and extends upwardly therefrom alongside the support member 18 of the jack.

The hose portion 27a is transparent, so that the level of liquid therein, indicated at 30 in FIG. 2, may be observed with respect to graduations 31 which are marked on the support portion 18 of the jack. Thus, while the hose portion 27a, which may be referred to as the sight portion of the level, remains fixed to the bar 29 and to the jack base member 16, the support portion or member 18 of the jack may be raised or lowered to correspondingly raise or lower the ceiling component 12 supported thereby, and the elevation of the component may be accurately determined by observing the liquid level 30 with respect to the graduations 31 on the support member 18. Of course, the supported component 12 may be raised or lowered as required by simply rotating the hand crank 23 of the jack actuating mechanism, in order that the component may be accurately coplanar with those which have been previously installed.

If the hose 27 is of clear, transparent plastic material, the sight portion 27a may be constituted by the end portion of the hose itself. However, if the hose 27 should be opaque, as for example, a rubber hose, the transparent sight portion 27a may be provided as a separate entity, connected to the end of the opaque hose.

We claim:

1. The combination of a jack comprising a base member, a load support member slidably telescoped in and extending upwardly from said base member, means for raising and lowering said load support member relative to the base member, and a fluid level comprising a fluid reservoir disposed remotely from said jack, a flexible tube connected to said reservoir, said tube having a transparent sight portion secured to the jack base member and extending alongside of said load support member, said load support member being provided with graduations with respect to which a level of fluid in said sight portion of the tube may be observed, said means for raising and lowering said load support member comprising a nut secured to one side of the support member, a screw-threaded shaft extending alongside the support member and operatively engaging said nut, a rotatable hand crank provided on said base member, and gearing operatively connecting said hand crank to said shaft.

2. The combination as defined in claim 1 together with an extension bar secured to said base member and extending upwardly alongside said load support member, the sight portion of said tube being secured to said extension bar.

3. The combination as defined in claim 1 together with a mobile scaffold having the base member of said jack secured thereto.